No. 769,956. PATENTED SEPT. 13, 1904.
C. R. PASCUCILLO.
DRILL CHUCK.
APPLICATION FILED OCT. 5, 1903.
NO MODEL.

Witnesses
R. H. Newman
A. L. DeLaney

Inventor
Charles R. Pascucillo
By
Chamberlain & Newman
Attorneys

No. 769,956. Patented September 13, 1904.

UNITED STATES PATENT OFFICE.

CHARLES R. PASCUCILLO, OF BRIDGEPORT, CONNECTICUT.

DRILL-CHUCK.

SPECIFICATION forming part of Letters Patent No. 769,956, dated September 13, 1904.

Application filed October 5, 1903. Serial No. 175,775. (No model.)

*To all whom it may concern:*

Be it known that I, CHARLES R. PASCUCILLO, a citizen of the United States, and a resident of Bridgeport, in the county of Fairfield and State of Connecticut, have invented certain new and useful Improvements in Drill-Chucks, of which the following is a specification.

My invention relates to new and useful improvements in chucks or holders such as are employed in drills or other machine-tools for retaining taps and like instruments.

The device, as is obvious, is designed principally to hold an instrument—as, for instance, a tap—while running a thread and to allow the same to automatically stop rotating when the threading of a hole is completed, yet permitting the spindle driving the chuck to continue rotating without breaking or injuring the tap, and, further, to again sufficiently grasp the tap to withdraw it when the spindle is reversed.

It is the object of the invention to simplify, cheapen, strengthen, and generally improve the construction of tools of its class; further, to provide a chuck which can be readily adapted for taps having different-sized shanks, and, finally, for providing means for setting the tap at different heights, as will be later more fully explained.

With the above objects in view my invention resides and consists in the novel construction and combination of parts shown upon the accompanying sheet of drawings, forming a part of this specification, in which similar letters of reference denote like or corresponding parts throughout the several figures, of which—

Figure 1:
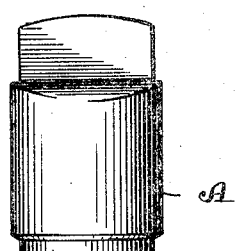
Figure 2:
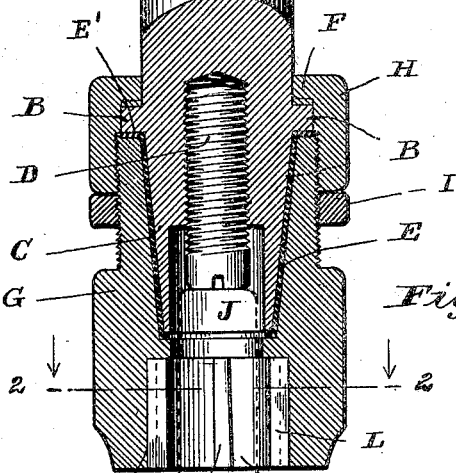
Figure 2:
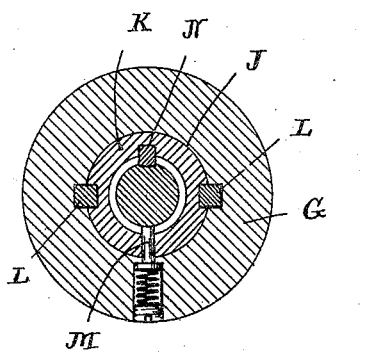
Figure 3:
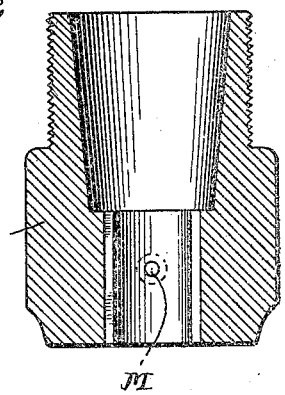

Figure 1 is a central vertical sectional view of my improved chuck or holder, a tap being shown therein in dotted lines. Fig. 2 is a transverse section on line 2 2 of Fig. 1, and Fig. 3 is a detail vertical sectional view of a slightly-modified form of sleeve forming one part of my improved chuck.

Referring in detail to the letters of reference marked upon the drawings, A indicates the shank of my chuck, which in practice is inserted into the head of the spindle to drive the chuck and tap.

B indicate an annular flange around the base of the shank, and C represents the tapering frictional lower end. This lower portion, as will be seen, is hollowed out, as at J, to receive the end of the tap-shank, as shown in dotted lines, Fig. 1.

An adjustable screw D is seated in a bore in the bottom of the hollow in the shank, so that its head protrudes more or less into the hollowed portion and forms an adjustable stop for the shank of the tap. A conical frictional bushing E encircles the tapering part C, and against this is placed the tap-carrying member or sleeve G, which, as shown, is shaped to correspond to the taper of the bushing and lower end of the shank, a second friction-piece E' in the form of a washer being placed between the flange B and the nut H covering the same. The upper peripheral surface of this sleeve is threaded to receive a nut H, which has a flange F to engage the flange B. On the sleeve is a lock-nut I to retain the nut H in place after the same has been adjusted. The sleeve G contains a central opening J' to receive a bushing K, which is secured to the sleeve by keys L, as shown. In practice small-sized taps are inserted in said bushing, while large sizes could be used without the bushing. If preferred, the bushing could be omitted, as shown in Fig. 3. A spring-actuated pin M serves to hold the bushing and tap in the sleeve by first passing through a hole in the former and engaging an annular groove in the latter, as clearly appears in Fig. 2. A key N, carried by the bushing, engages a slot in the shank to fix the same and impart rotary motion thereto. It will be seen that this construction and special assemblage of parts can be so adjusted and tightened as to drive the sleeve and nuts with the shank—when tapping a hole, for instance—but will allow the shank to turn independently within the sleeve and nuts when the tap meets with material resistance—as, for instance, by running against the bottom of the hole it may be threading.

In practice the nuts H and sleeve are tightened only sufficiently to afford a frictional engagement between the tapering end of the shank and the sleeve to drive the tap in to cut a thread, but yet loose enough to insure its slipping when the tap runs its thread and strikes the bottom, thus preventing injury to either tap or chuck. By properly adjusting the screw D the direct inward thrust of the tap, which would otherwise be on the sleeve G, is transferred to the shank A, thus preventing this inward thrust from interfering with the adjustment of the frictional contact between the sleeve and the shank and preventing the sleeve from pressing any harder than necessary on the conical frictional bushing E.

The long tapering bushing affords a particularly desirable friction, while the screw and bushing readily provides for different diameters and lengths of taps.

Having thus described my invention, what I claim, and desire to secure by Letters Patent, is—

A drill-chuck of the character described, comprising a shank provided with a tapering end having a hollow or recess therein, a sleeve provided with tapering recess embracing the tapering end of the shank and having its bore in line with the recess in the shank, a frictional conical sleeve between the tapering end of the shank and the sleeve, and a screw threaded into the shank in the bottom of the recess therein and adapted to receive the end thrust of a tool seated in and projecting through the bore of the sleeve, substantially as described.

Signed at Bridgeport, in the county of Fairfield and State of Connecticut, this 4th day of September, A. D. 1903.

CHARLES R. PASCUCILLO.

Witnesses:
  C. M. NEWMAN,
  W. V. DEVITT.